US006886256B2

(12) United States Patent
Hobday et al.

(10) Patent No.: US 6,886,256 B2
(45) Date of Patent: May 3, 2005

(54) BRUSH SAW CUTTING HEAD WITH INTEGRAL HERBICIDE APPLICATOR

(75) Inventors: Bryan Marc Hobday, Vancouver (CA); Peter Williams, Vancouver (CA)

(73) Assignee: Apex Reforestation Ltd., Vancouver (CA)

( * ) Notice: Subject to any disclaimer, the term of this patent is extended or adjusted under 35 U.S.C. 154(b) by 80 days.

(21) Appl. No.: 10/436,148

(22) Filed: May 13, 2003

(65) Prior Publication Data

US 2004/0045166 A1 Mar. 11, 2004

(30) Foreign Application Priority Data

Sep. 11, 2002 (CA) .............................................. 2400315

(51) Int. Cl.⁷ .............................................. B23D 59/02
(52) U.S. Cl. .............................. 30/123.3; 30/388; 47/1.5
(58) Field of Search .............................. 30/123.3, 388, 30/276; 56/16.8; 47/1.5

(56) References Cited

U.S. PATENT DOCUMENTS 4,926,622 A 5/1990 McKee
6,073,389 A 6/2000 Piccolo
6,446,420 B1 * 9/2002 Worsham et al. ............ 56/27.5

OTHER PUBLICATIONS

Sproutless Herbicide Applicator, http://www.rittenhouse.ca/asp/Product.asp?PG=754, 2003 web site publication of M.K. Rittenhouse & Sons, St. Catharines, Ontario, Canada.

* cited by examiner

*Primary Examiner*—Douglas D Watts
(74) *Attorney, Agent, or Firm*—Oyen Wiggs Green & Mutala LLP

(57) ABSTRACT

A chamber is formed in the upper end of a brush saw cutting head housing. The brush saw cutting element drive spindle's upper end projects into the chamber. The drive spindle's lower end projects beneath the housing and is drivingly couplable to the cutting element. A disc is mounted against the underside of the cutting element. A cavity is formed in the disc. At least one channel extends through the disc, between the cavity and the disc's external rim. An aperture extends through the drive spindle, between the chamber and the cavity. Herbicide supplied to the chamber flows from the chamber, through the drive spindle aperture, into the cavity. The drive spindle rotates the disc. Centrifugal force imposed on herbicide within the cavity forces the herbicide through the channel(s) onto the underside of the cutting element, for transfer onto the stumps of material cut by the element.

17 Claims, 5 Drawing Sheets

BRUSH SAW CUTTING HEAD WITH INTEGRAL HERBICIDE APPLICATOR

TECHNICAL FIELD

This invention pertains to controlled application of herbicide to the underside of a brush saw's saw blade to prevent resprouting of cut brush.

BACKGROUND

Brush saws (sometimes called brushcutters) are used to cut brush or other vegetation from power line right of way areas, roadsides, forestry plantations, etc. In a typical brush saw, a drive motor and a cutting head are mounted at opposite ends of a support tube. A drive shaft is drivingly coupled through the support tube, between the drive motor and a pinion gear mechanism inside the cutting head. The pinion gear mechanism is in turn coupled to a drive gear spindle on which a cutting element such as a saw blade is rotatably mounted. Handlebars are provided on the support tube, between the drive motor and the cutter head. An operator grasps the handlebars and manipulates the brush saw to move the rotating saw blade through brush or other plant material which is to be cut. Controls on the handlebar enable the operator to stop the motor, vary the motor's speed, etc.

A commonly encountered problem is that stumps of cut plant material tend to resprout fresh shoots or buds which eventually mature, necessitating repetition of the cutting operation. Herbicide can be applied to the stumps to kill the cut plant or significantly retard its ability to resprout. It is often desirable to apply herbicide simultaneously with the cutting operation to avoid the time and expense of a separate herbicide application operation; and, because herbicides are more effective if applied immediately after cutting.

One relatively unsuccessful prior art technique is to dispense (drip) herbicide from a reservoir onto the upper surface of the brush saw's rotating saw blade. The difficulty with this technique is that little, if any, herbicide reaches the underside of the saw blade. Consequently, little, if any, herbicide is transferred to the cut material stumps, which is where the herbicide is required to prevent resprouting.

In another prior art technique, a herbicide reservoir is mounted on the underside of the brush saw's saw blade. Centrifugal force imposed on the reservoir as it rotates with the saw blade forces herbicide upwardly from the reservoir through a gasket onto the underside of the saw blade. Although this technique applies herbicide where it is needed (i.e. on the underside of the saw blade where the herbicide can be transferred to cut stumps) the somewhat bulky reservoir reduces the saw blade's effective cutting area. This technique also does not allow the operator to monitor or continually control the rate at which herbicide is dispensed while the brush saw is operating. Moreover, despite the reservoir's bulk, it contains a limited amount of herbicide. This necessitates more frequent stoppage of the brush saw so that the reservoir can be refilled, thus increasing the risk of herbicide spillage.

This invention addresses the shortcomings of the prior art.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
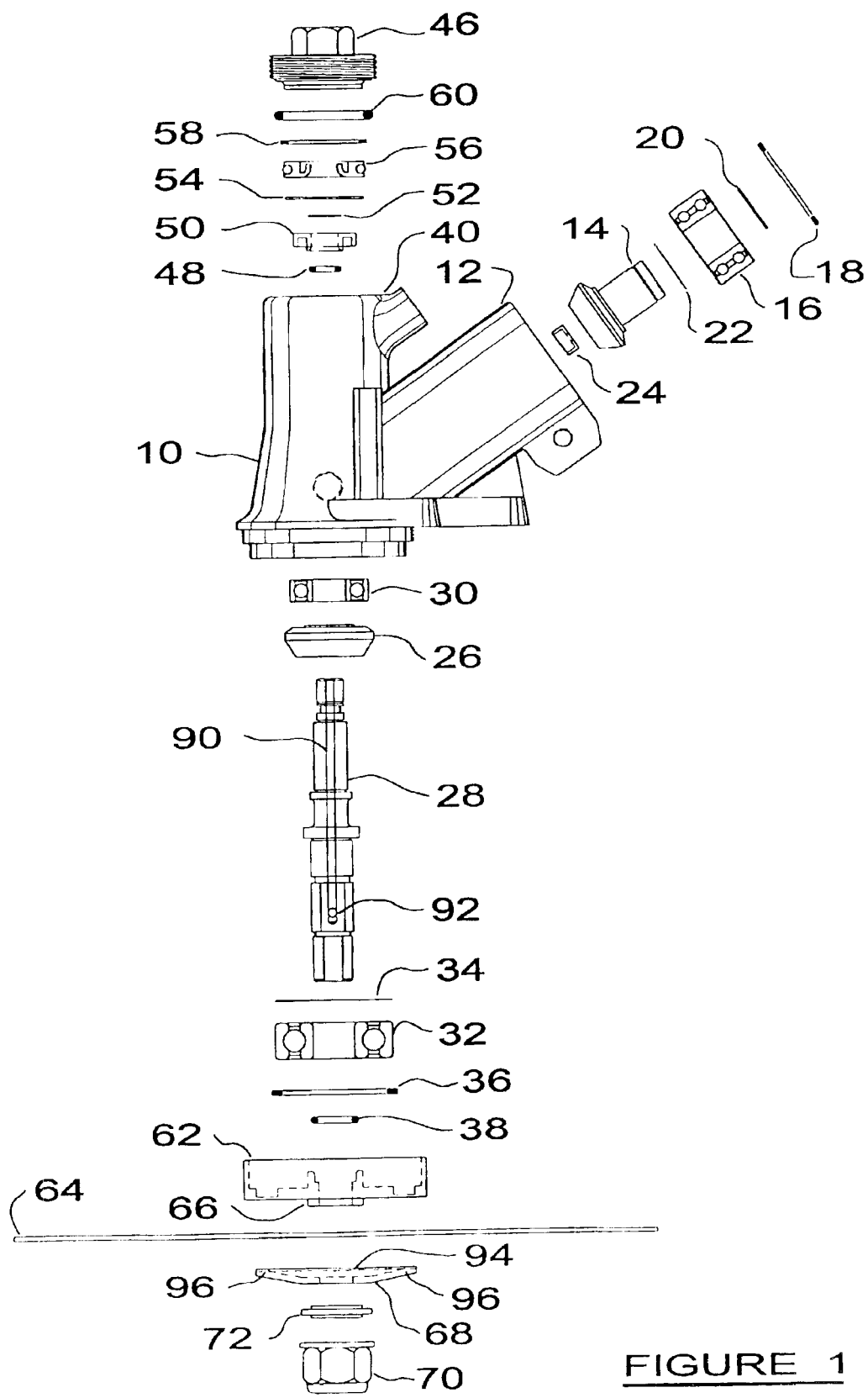
FIG. 1 is an exploded side elevation view of a brush saw cutting head in accordance with the invention.
Figure 2:
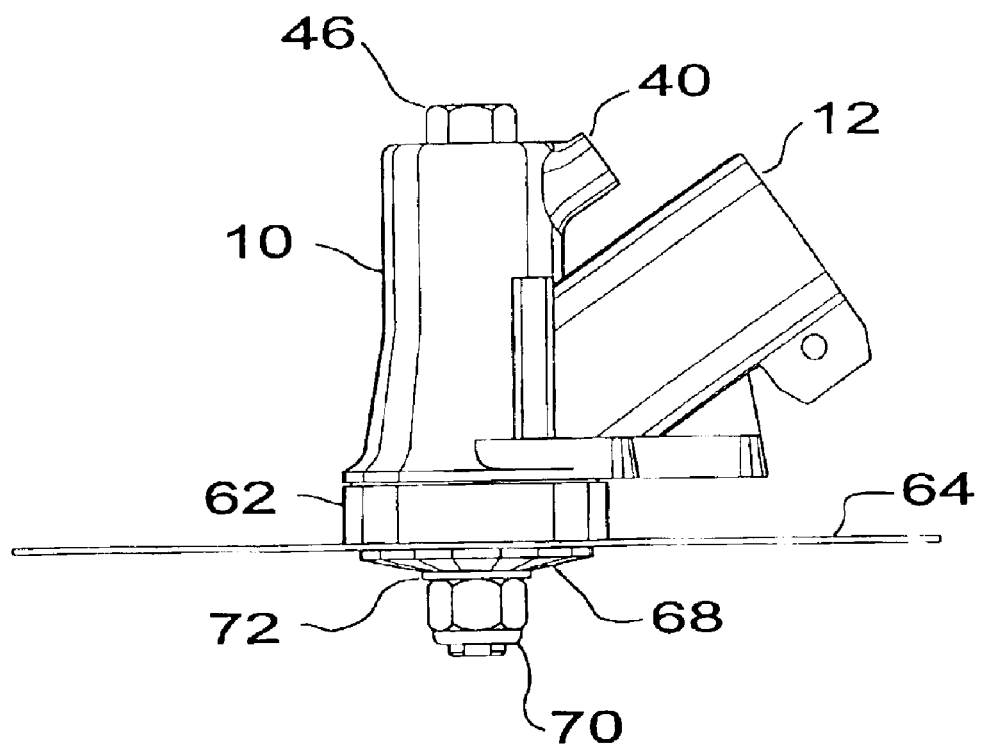
FIG. 2 is a side elevation view of the FIG. 1 apparatus in the assembled state.

As seen in FIG. 1, the invention provides a brush saw cutting head housing 10 having an upwardly and rearwardly projecting socket 12 into which a brush saw support tube (not shown) can be fitted in conventional fashion. One end of the brush saw's drive shaft (not shown) is coupled to spiral bevel (pinion) gear 14 which is rotatably mounted within bearing 16 inside socket 12. Snap rings 18, 20 prevent dislodgement of pinion gear 14 and bearing 16 from socket 12. Optional spacer 22 maintains spacing between pinion gear 14 and bearing 16. Grease insert 24 assists lubrication.

The teeth of pinion gear 14 mesh with those of spiral bevel (spindle) gear 26 which is mounted inside a vertically chambered portion of housing 10. Drive spindle 28 extends through and is fixed to spindle gear 26, for rotation therewith. Bearings 30, 32 rotatably support drive spindle 28 within housing 10. Shim 34 maintains snug fit engagement of bearing 32 once snap ring 36 is in place on the opposite side of bearing 32. Snap ring 36 also prevents dislodgement of spindle gear 26, drive spindle 28 and bearings 30, 32 from within housing 10.

Figure 4:
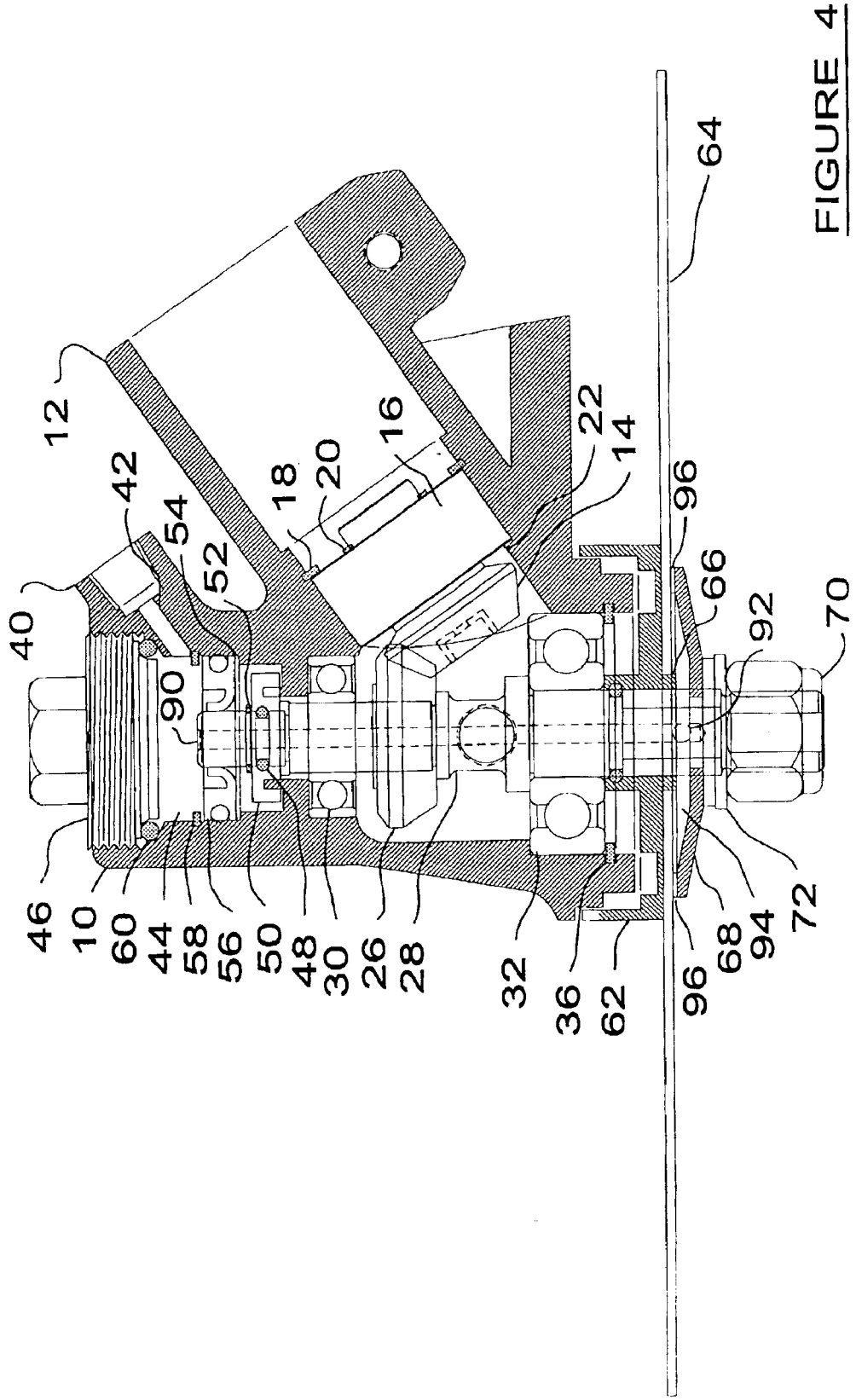
FIG. 4 is an enlarged cross-sectional view of the FIG. 2 apparatus.

A second socket 40 projects upwardly and rearwardly from housing 10, above socket 12. As seen in FIG. 4, a fluid flow orifice 42 extends between socket 40 and chamber 44 formed in the upper end of housing 10. The upper end of drive spindle 28 protrudes into chamber 44. The lower end of drive spindle 28 projects beneath housing 10. Chamber 44 is closed by screwing threaded cap 46 into mating threads machined in the upper end of chamber 44. Cap 46 can be unscrewed and removed from housing 10 to provide maintenance access to chamber 44. This allows O-ring 48, deflector 50, snap ring 52, seal backing disc 54, seal 56 and snap ring 58 to be fitted over the upper end of drive spindle 28, as seen in FIG. 4. Seal 56 prevents fluid leakage downwardly from chamber 44, between housing 10 and drive spindle 28. Deflector 50 rotates with drive spindle 28 to deflect outwardly away from drive spindle 28 any fluid which may seep past seal 56 if seal 56 fails, to protect gears 14, 26 and bearings 16, 30, 32 from damage due to contact with herbicide. O-ring 60 provides sealing engagement when cap 46 is screwed onto housing 10 as aforesaid.

Spindle washer 62 is fitted over the lower end of drive spindle 28, which protrudes vertically downwardly from the lower end of housing 10. Saw blade 64 is then fitted over protrusion 66 on the underside of spindle washer 62. Reservoir disc 68 is held against the underside of saw blade 64 by lock nut 70. Reservoir disc 68's shallow depth and small diameter minimizes reduction of saw blade 64's effective cutting area. Optional seal 72 can be mounted between reservoir disc 68 and lock nut 70 to prevent fluid leakage downwardly past reservoir disc 68. In operation, the brush saw's drive motor (not shown) rotates the drive shaft (not shown), drivingly rotating meshed gears 14, 26 thereby drivingly rotating drive spindle 28, saw blade 64 and reservoir disc 68.

Figure 5:
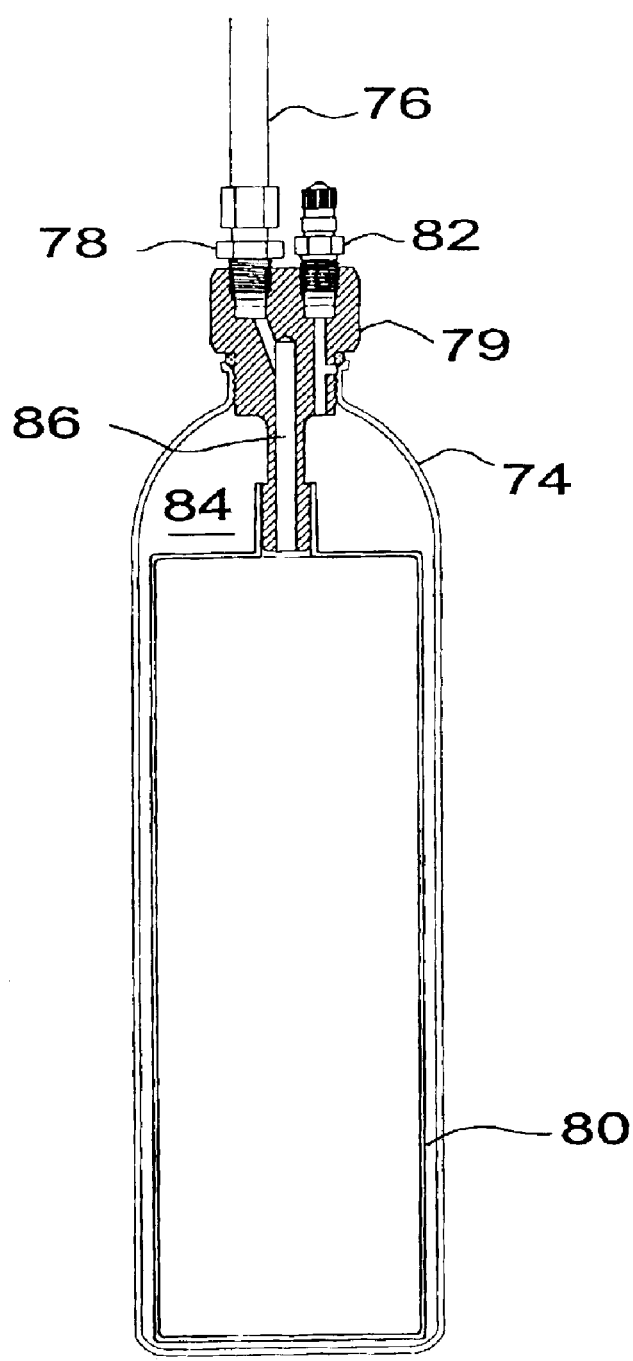
FIG. 5 is a cross-sectional side elevation view of a herbicide canister for use with the apparatus of FIGS. 1–4.

Herbicide supplied from a suitable container such as canister 74 (FIG. 5) is controllably dispensed through flexible conduit 76, one end of which is fitted over coupler 78 mounted in the canister 74's removable cap 79. A flexible bladder 80 within canister 74 contains the herbicide fluid. One-way air valve 82 mounted in cap 79 allows compressed air to be injected into space 84 between canister 74's inner surface and bladder 80's outer surface. Air pressure within space 84 collapses bladder 80 as herbicide is dispensed therefrom through orifice 86, coupler 78 and conduit 76, allowing herbicide to flow out of bladder 80 irrespective of canister 74's orientation.

The opposite end of conduit 76 is fitted within socket 40. Suitable coupling and metering devices (not shown) can be provided in conduit 76 to allow the operator to control the volume and flow rate of herbicide dispensed from bladder 80 through conduit 76 and orifice 42 into chamber 44. Quick connect-disconnect type coupling devices (not shown) can be used to allow the operator to rapidly disconnect an empty canister and connect a full canister in its place, with minimal herbicide spillage. Empty canisters can be efficiently refilled at a centralized location where potential herbicide spillage can be dealt with quickly and effectively.

A longitudinal aperture 90 is bored axially through drive spindle 28 from the upper end of drive spindle 28. Aperture 90 extends only to the lower region of drive spindle 28—not completely through drive spindle 28. A second aperture 92 is bored transversely through drive spindle 28 to intersect aperture 90. Aperture 92 is located such that when the apparatus is assembled as shown in FIG. 4, aperture 92 also intersects cavity 94 formed in the upper portion of reservoir disc 68. This allows herbicide to flow from chamber 44 through apertures 90, 92 into cavity 94 adjacent the underside of saw blade 64.

At least one and preferably a plurality of small diameter fluid flow channels 96 are formed in and extend radially outwardly through the upper end of reservoir disc 68, between cavity 94 and the external rim of reservoir disc 68. As saw blade 64 and reservoir disc 68 rotate, centrifugal force is imposed on the herbicide within cavity 94, forcing the herbicide through channel(s) 96 onto the underside of saw blade 64 for transfer onto the stumps of material by saw blade 64.

Figure 3:
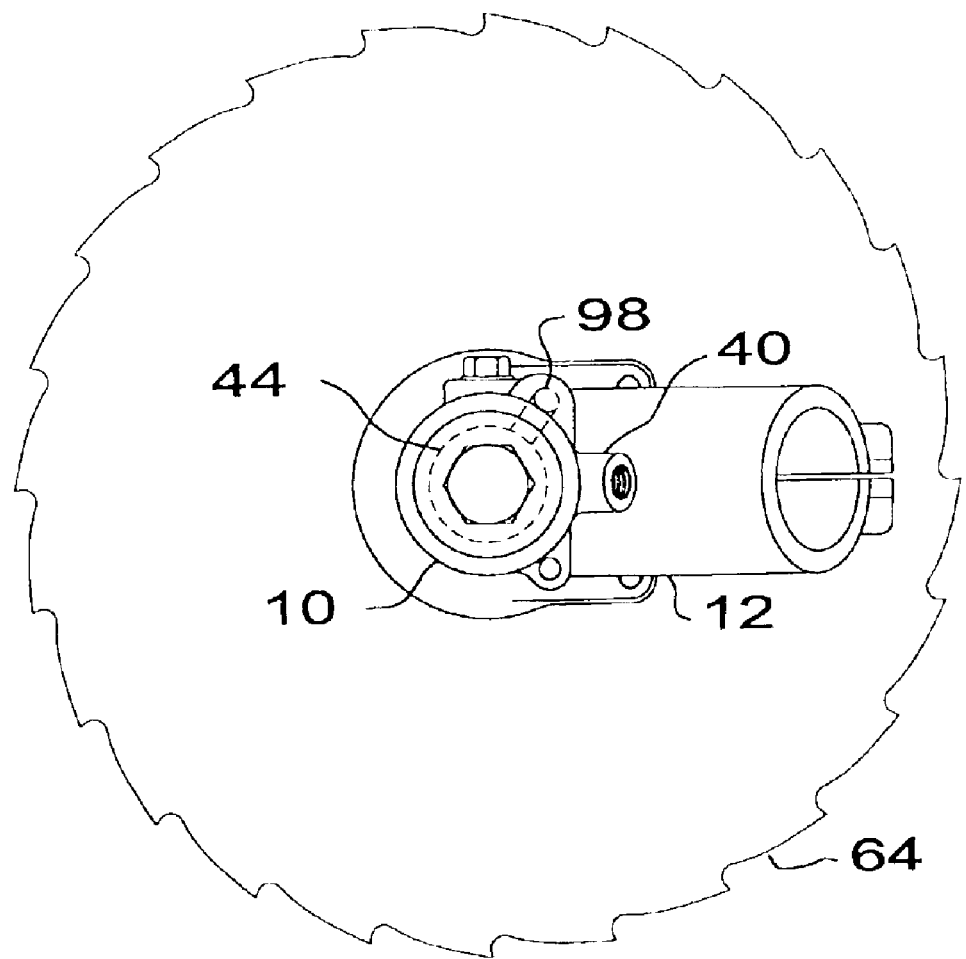
FIG. 3 is a top plan view of the FIG. 2 apparatus.

A weep hole 98 (FIG. 3) bored in housing 10 permits herbicide to escape from the space between deflector 50 and seal 56 in the event of failure of seal 56.

As will be apparent to those skilled in the art in the light of the foregoing disclosure, many alterations and modifications are possible in the practice of this invention without departing from the spirit or scope thereof. For example, neither reservoir disc 68 nor cavity 94 are essential and may both be eliminated. In such case, fluid flow channel(s) 96 can be provided in the upper end of lock nut 70 such that herbicide flows directly from aperture 92 into fluid flow channel(s) 96. Alternatively, fluid flow channel(s) 96 can be provided in seal 72, if seal 72 is used. As a further alternative, if reservoir disc 68 is provided, it need not have a cavity 94—fluid flow channel(s) 96 may extend through the upper end of reservoir disc 68 and intersect aperture 92 without any intermediate cavity.

As another example, seal 56 is shown in the drawings as a VARILIP™ lip type seal, but it may alternatively be an inline type seal such as a ceramic seal (not shown) mounted atop drive spindle 28 to allow fluid to flow directly from fluid flow orifice 42, through the inline seal and into aperture 90. If an inline seal is used then chamber 44 can be eliminated—space need only be provided to contain the inline seal.

As a further example, chamber 44 need not be formed within housing 10 as illustrated. A separate external chamber (with or without a cap) can be mounted atop, above or beside housing 10. In such case, second socket 40 could be configured to allow fluid flow orifice 42 to communicate with the external chamber, and a separate coupler conduit (not shown) provided to allow fluid to flow from the external chamber into aperture 90, with appropriate sealing again being provided to protect gears 14, 26 and bearings 16, 30, 32 from damage due to contact with herbicide.

The scope of the invention is to be construed in accordance with the substance defined by the following claims.

What is claimed is:

1. A brush saw cutting head comprising:
   (a) a drive spindle having lower end drivingly couplable to a cutting element;
   (b) an aperture extending through said drive spindle between an upper end of said drive spindle and a lower end region of said drive spindle above said drive spindle lower end;
   (c) a member positioned against an underside of said cutting element;
   (d) at least one fluid flow channel extending through said member in fluid communication between said drive spindle aperture and an external rim of said member; and
   (e) a housing having a chamber formed in an upper end of said housing, said drive spindle upper end projecting into said chamber, said chamber in fluid communication between said drive spindle aperture and said chamber.

2. A brush saw cutting head comprising:
   (a) a drive spindle having a lower end drivingly couplable to a cutting element;
   (b) an aperture extending through said drive spindle between an upper end of said drive spindle and a lower region of said drive spindle above said drive spindle lower end;
   (c) a member positioned against an underside of said cutting element;
   (d) at least one fluid flow channel extending through said member in fluid communication between said drive spindle aperture and an external rim of said member; and
   (e) a housing having a chamber formed in an upper end of said housing, said drive spindle upper end projecting into said chamber for fluid communication between said drive spindle aperture and said chamber;
   wherein said member further comprises a disc having a cavity, said cavity in fluid communication between said drive spindle aperture and said fluid flow channel.

3. A brush saw cutting head as defined in claim 2, further comprising a seal mounted between said chamber and said drive spindle upper end to prevent fluid passage from said chamber between said housing and said drive spindle.

4. A brush saw cutting head as defined in claim 3, further comprising a fluid deflector fixed to said drive spindle beneath said seal, said deflector rotatable with said drive spindle to deflect fluid outwardly away from said drive spindle.

5. A brush saw cutting head as defined in claim 2, wherein said drive spindle aperture further comprises:
   (i) a longitudinal aperture extending between said chamber and said drive spindle lower region; and,
   (ii) a transverse aperture in said drive spindle lower region, said transverse aperture extending between said longitudinal aperture and said cavity.

6. A brush saw cutting head as defined in claim 2, further comprising a fluid flow orifice in said housing, said orifice extending between said chamber and a socket couplable to one end of a fluid conduit.

7. A brush saw cutting head as defined in claim 6, further comprising:
   (a) a fluid canister couplable to an opposite end of said fluid conduit; and,
   (b) a fluid-containing bladder within said canister, said bladder in fluid communication with said fluid conduit.

8. A brush saw cutting head as defined in claim 7, further comprising; a valve in said canister for injection of pressurized air between said canister and said bladder.

9. A brush saw cutting head, comprising:
   (a) a housing;
   (b) a chamber formed in an upper end of said housing;
   (c) a drive spindle having an upper end projecting into said chamber and a lower end projecting beneath said housing, said drive spindle lower end drivingly couplable to a cutting element;
   (d) a seal mounted between said chamber and said drive spindle upper end to prevent fluid passage from said chamber between said housing and said drive spindle;
   (e) a disc mounted against an underside of said cutting element;
   (f) a cavity formed in said disc;
   (g) at least one channel extending through said disc between said cavity and an external rim of said disc; and,
   (h) an aperture extending through said drive spindle between said chamber and said cavity.

10. A brush saw cutting head comprising:
    (a) a drive spindle having a lower end drivingly couplable to a cutting element;
    (b) an aperture extending through said drive spindle between an upper end of said drive spindle and a lower region of said drive spindle above said drive spindle lower end;
    (c) a member positioned against an underside of said cutting element:
    (d) at least one fluid flow channel extending over said member in fluid communication between said drive spindle aperture and an external rim of said member; and
    (e) a housing having a chamber formed in an upper end of said housing, said drive spindle upper end projecting into said chamber, said chamber in fluid communication between said drive spindle aperture and said chamber.

11. A brush saw cutting head comprising:
    (a) a drive spindle having a lower end drivingly couplable to a cutting element;
    (b) an aperture extending through said drive spindle between an upper end of said drive spindle and a lower region of said drive spindle above said drive spindle lower end;
    (c) a member positioned against an underside of said cutting element;
    (d) at least one fluid flow channel extending over said member in fluid communication between said drive spindle aperture and an external rim of said member; and
    (e) a housing having a chamber formed in an upper end of said housing, said drive spindle upper end projecting into said chamber for fluid communication between said drive spindle aperture and said chamber;
    wherein said member further comprises a disc having a cavity, said cavity in fluid communication between said drive spindle aperture and said fluid flow channel.

12. A brush saw cutting head as defined in claim 11, further comprising a seal mounted between said chamber and said drive spindle upper end to prevent fluid passage from said chamber between said housing and said drive spindle.

13. A brush saw cutting head as defined in claim 12, further comprising a fluid deflector fixed to said drive spindle beneath said seal, said deflector rotatable with said drive spindle to deflect fluid outwardly away from said drive spindle.

14. A brush saw cutting head as defined in claim 11, wherein said drive spindle aperture further comprises:
    (i) a longitudinal aperture extending between said chamber and said drive spindle lower region; and,
    (ii) a transverse aperture in said drive spindle lower region, said transverse aperture extending between said longitudinal aperture and said cavity.

15. A brush saw cutting head as defined in claim 11, further comprising a fluid flow orifice in said housing, said orifice extending between said chamber and a socket couplable to one end of a fluid conduit.

16. A brush saw cutting head as defined in claim 15, further comprising:
    (a) a fluid canister couplable to an opposite end of said fluid conduit; and,
    (b) a fluid-containing bladder within said canister, said bladder in fluid communication with said fluid conduit.

17. A brush saw cutting head as defined in claim 16, further comprising a valve in said canister for injection of pressurized air between said canister and said bladder.

* * * * *